Feb. 16, 1937. A. J. BARNHART ET AL 2,070,981

FLAT TIRE INDICATOR

Filed May 15, 1935

Inventors
A. J. Barnhart
R. F. Essert by Hazard and Miller
Attorneys.

Patented Feb. 16, 1937

2,070,981

UNITED STATES PATENT OFFICE 2,070,981

FLAT TIRE INDICATOR

Andrew J. Barnhart and Ralph F. Essert, Placentia, Calif.

Application May 15, 1935, Serial No. 21,546

9 Claims. (Cl. 116—34)

Our invention relates to a sound emitting device to indicate deflation of pneumatic tires in the operation of vehicles, whereby when the tire becomes deflated below the ordinary air pressure, the sound emitting device operates to give a distinct sound audible to the driver of the vehicle.

An object and feature of the invention is using a sound emitting device which may be attached to the wheel of the vehicle, preferably to the rim to which a pneumatic tire is attached. This device is normally inoperative when a tire is properly inflated. With this device we also secure to the wheel of the vehicle a device actuated by the pneumatic tire. This latter device contacts the tire should it become unduly deflated at the portion of the tire adjacent the ground which has the greatest deflection and causes the sound emitting device to operate. Also when the latter device is at the top of the wheel in the rotation of the tire, the said actuating device has a spring tension which again causes it to actuate the sound emitting device.

Thus a further object and feature of our invention is a combination sound emitter or sound producer and an actuating device therefor, both rotating with the wheel and producing a sound when the device passes over the ground contact of the tire and the tire is unduly spread and then gives another similar sound when the tire recovers its shape at the uppermost part of the wheel. Thus in the operation of a vehicle our invention operates to give two distinct sounds for each rotation of the wheel.

A further object and feature of our invention is in the employment of a sound producing device which gives a clicking noise or sound, this being of a character distinctly different from any of the noises which might be developed in the engine or in the ordinary operation of a motor vehicle and thus immediately attracting attention of the driver to the fact that one or more of his tires is becoming unduly deflated.

Considered more specifically, an object and feature of our invention is supporting and mounting a sound producing or emitting device on the rim of a wheel, the supporting structure being held in place by the rim and the bead of the tire, the supporting device extending inside the rim, that is between the rim and the hub of the wheel and being firmly attached to the wheel to rotate therewith. In combination with the supporting device having the sound emitter, we utilize a resilient actuating arm, also preferably secured and attached at one end to the support for the sound emitter. This arm has a natural spring tension causing a movement towards the radial plane through the tire. Such arm is preferably formed of a strip of spring steel having its free end positioned to engage the side wall of a tire when such side wall is pressed outwardly due to the deflation of the tire, this spread being greatest at the part of the tire in contact with the ground. This contact forces the arm outwardly and then when the arm reaches the uppermost part of its travel the spring tension moves the arm inwardly. We employ an actuating device between the arm and the sound emitter to actuate the sound emitter thus twice during each rotation of the wheel when the tire is unduly deflated; the sound emitter being inoperative when the tire is properly inflated.

A further feature of our invention is employing as a sound emitter a resilient spring tongue held at one end, this having a natural tendency to spring outwardly, but is normally held in its innermost position by an operating pin connected to the actuating arm. Therefore during the inward and outward movement of the arm and hence the pin, the sound emitting tongue or reed gives a click each time its deflection is changed; the outwardly deflection being by the natural resilient spring tension of the reed and the inward movement by the positive pressure of the actuating pin on the reed.

Our invention is illustrated in connection with the accompanying drawing, in which, Fig. 1 is an elevation of the outside of a wheel, taken in the direction of the arrow 1 of Fig. 3.

Figure 1:
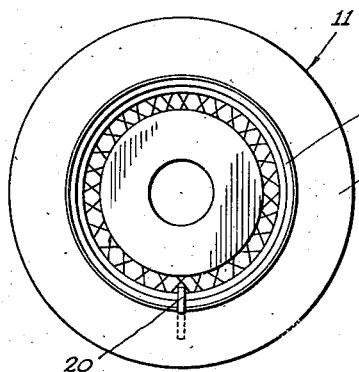
Figure 2:
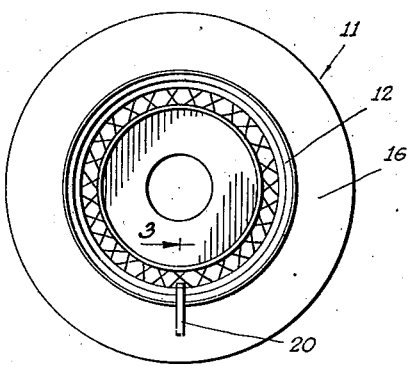
Fig. 2 is an elevation of the inside of a wheel taken in the direction of the arrow 2 of Fig. 3.

In the illustration a wheel with the tire as a whole is designated by the numeral 11. This has a rim 12 such being a conventional rim. This rim is shown as having a drop center 13 and two marginal edges 14 within which is caught and engaged the bead 15 of the tire 16. In our invention we employ an arched holding strap 20, this being of stiff metal and having two hooked ends 21. These ends engage underneath the marginal portions 14 of the rim and are caught between such portions and part of the bead of the tire. The strap arches over the drop center section of the rim and on account of the strap being of sufficient length considered in a peripheral direction, the holding strap is rigidly attached to the rim so long as the tire is attached to the rim. The holding strap is provided with a perforation 22 on one side.

Figure 4:
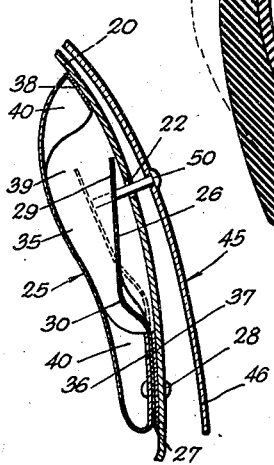
Fig. 4 is an enlarged section similar to Fig. 3 of the sound emitting device.

The sound emitting device designated by the assembly numeral 25 employs a reed 26. This reed is made of a strip of spring steel of less width than the supporting strap 20. The fixed end 27 of the reed is secured by a rivet 28 to the strap 20 adjacent one of the hooks 21. The reed has a free end 29 and intermediate the clamped and the free end of the reed there is a reversible section 30. This consists of a slight depression which is flexed in opposite directions with a quick or snapping action when the reed is bent, for instance, from the full to the dotted line position of Fig. 4 or the reverse. The double flexing of the sound producing section 30 is indicated by the full and dotted lines of Fig. 4.

The preferable manner of attaching the reed is by using a resonator cover 35, this having a metal end piece 36 on one side of the fixed end of the reed and a bent-over strip 37 on the opposite side adjacent the strap 20. The whole assembly of the fixed end 27 of the reed and the two parts 36 and 37 of the resonator are attached to the strap by the rivet 28. The opposite end of the resonator 38 is bent inwardly and attached to the strap 20. The resonator has open marginal portions 39 on each side. It has slight side portions 40 adjacent the fixed end of the reed to clamp this fixed end at its side edges, thus assuring a firm attachment of the fixed end of the reed; the sound emitting section 30 being preferably located closely adjacent to the fixed portion of the reed.

The actuator 45 consists of a resilient arm 46 made in the form of a strip and having a fixed or attached end 47 secured to the supporting strap 20 preferably adjacent one of the hooks 21 opposite the hook adjacent to which the sound emitter is attached. It is preferable to have a spacing strip 48 at this fixed end of the arm. A rivet 49 is located at about the center of the arch of the strap 20 and fixedly secures the arm to the center portion of the strap, preferably slightly spaced from the strap. An actuating pin 50 is secured to the arm 46 and extends through the perforation 22 in the holding or supporting strap 20; the end of the pin being adapted to engage the free end 29 of the reed 26.

The free end 51 of the actuator or arm 46 is positioned to engage the side wall 47 of the tire 16; when the tire is properly inflated this may be by a slight contact or in fact the free end 51 may be slightly spaced from a properly inflated tire even when this tire is slightly deflected by contact with the ground. The arm 46 is resilient and has a natural tension incorporated therein tending to move the free end inwardly towards the tire in the direction of the arrow 52.

Figure 3:
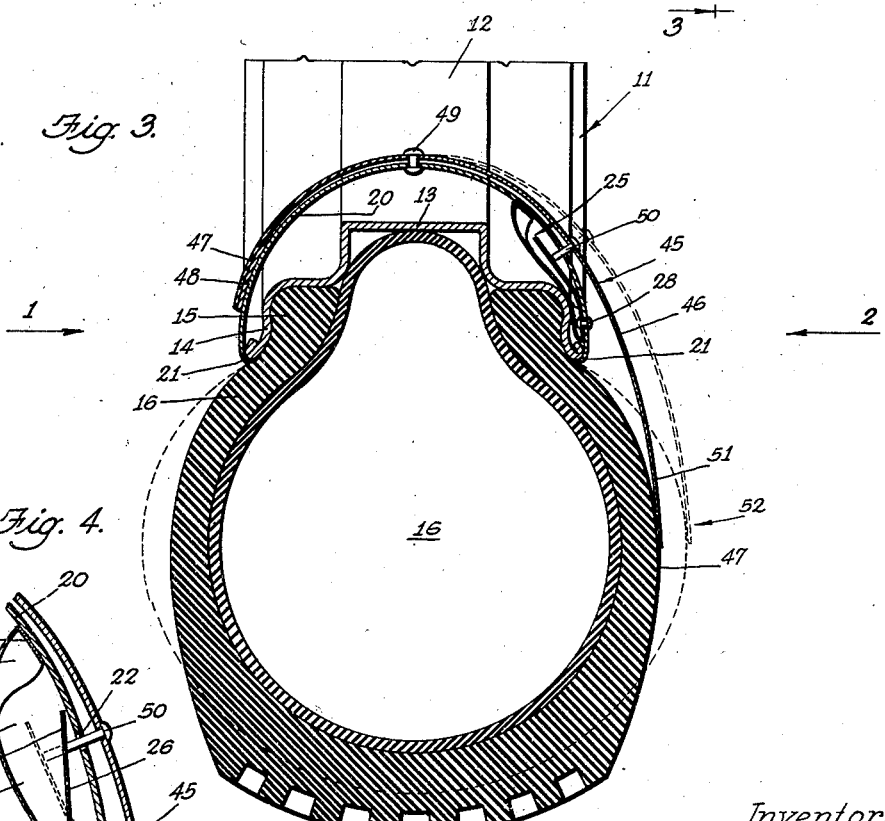
Fig. 3 is a radial section of the wheel taken on the line 3—3 of Fig. 2 in the direction of the arrows.

The operation and functioning of our device is substantially as follows: In the normal operation of the device and the tire, the arm 46 is sprung inwardly by its natural tension and causes the pin 50 to contact the reed and to press the free end of the reed inwardly towards the rim as shown in full line position in Fig. 3 and dotted line position in Fig. 4. With the tire properly inflated there is insufficient deflection of the tire, both when in contact with the ground adjacent the sounding device and when this is at the top of the wheel, to change the deflection of the reed and therefore the vehicle operates with the reed always pressed inwardly and emitting no sound. However, should the tire become deflated it is distorted at the portion in contact with the ground as shown by the dotted lines in Fig. 3. This causes the side wall 47 of the tire to press outwardly on the free end 51 of the actuator strap 45 moving this to the dotted line position of Fig. 3 and in a direction opposite to the arrow 52. This movement relieves the pressure of the pin 50 on the free end of the reed 26 and allowing this reed to assume its natural position to which it is bent and set, which is that of the full line position of Fig. 4. This action of the reed, due to its own resiliency, causes the operation of the sound producing section 30 which reverses from the dotted line position of Fig. 4 to the full line position and gives a clicking sound. This is due to the quick reversal of the section 30.

As the wheel rotates, the holder 20 and the assembly are carried to the top of the wheel, the part of the tire in contact with the ground is still deformed or slightly flattened, but the part above the ground and at the top of the wheel resumes its original contour. This allows the free end 51 of the actuator strap 45 to move inwardly under its own tension in the direction of the arrow 52 causing the pin 50 to positively press the free end 29 of the reed from the full line position of Fig. 4 to the dotted line position, that is to its original inward position. This reversed bending of the reed causes the quick reversal of the sound producing section 30 from the full line position of Fig. 4 to the dotted line position and thus causes a click when the sounding device reaches the top of the wheel in the progression of a vehicle.

Thus with our device there are two distinct and separate sounds emitted when a tire becomes deflated, once when the sounding device is closest to the ground and again when it is remote from the ground in the upper portion of its travel. The click or sound is readily noticeable by the driver and is quite different from sound ordinarily produced by the engine or any other operative part of the vehicle, calling the driver's attention to the fact that one or more of his tires is becoming deflated and allowing stopping of the vehicle before either damage is caused to the tire or to the vehicle. It will be manifest that tires can be readily installed or replaced and our indicator secured in place when a tire is attached to the rim and inflated.

Various changes may be made in the details of construction without departing from the spirit or scope of the invention as defined by the appended claims.

We claim:

1. A tire deflation indicator, comprising in combination a wheel having a rim, a pneumatic tire attached thereto, a holding device in the form of a strap having hooks engaged by the rim and part of the tire, a sound emitter having a reed with one end rigidly secured to the said device, the said reed being flexible to bend in reverse directions, a resilient arm in the form of a strip of metal secured to the said strap of the holding device and having a free end positioned normally adjacent the side wall of a tire when the tire has its normal contour, the said arm being deflected outwardly on the spreading of the tire, and a pin secured to the arm and contacting the reed.

2. A tire deflation indicator as claimed in claim 1, the reed having a reverse flexing section whereby when the reed normally occupies its innermost position, the flexing section is bent outwardly, the reed reversing its flexure on outward movement of the said arm and giving a sound when the tire is spread, the arm having a tension to move inwardly and the said pin then reversing the flexure of the reed to again emit a sound when the tire resumes its normal contour.

3. A tire deflation indicator comprising in combination a wheel having a rim, a tire having beads secured to the rim, a holding device in the form of an arch strap having hooks at its two ends, the hooks being secured by the edge of the rim and a portion of the beads, a sound emitter including a resilient metal reed formed of a strip having one end firmly secured to the holding device adjacent one edge of the rim, said reed having a normal tension to flex inwardly and having a sound producing section giving a reverse distortion when the reed is flexed, in opposite directions, a resilient actuating arm in the form of a spring strip secured at one end to the holding device and having a free end, the arm having a normal tension to move inwardly towards the side wall of the tire, a pin attached to the arm and positioned to engage the free end of the reed, the said arm being deflected outwardly when the tire spreads, permitting the reed to emit a sound, the said arm moving inwardly when the tire regains its normal contour and flexing the reed inwardly, the reed thereby emitting a second sound on rotation of the wheel.

4. A deflation indicator for tires having a holding device with means for attaching said device to the rim of a wheel, whereby said device may extend inside of the rim between its opposite sides, a sound emitter attached to the holding device, an actuating arm in the form of a resilient strip attached to the holding device and having its free end adapted to be deflected by a spreading pneumatic tire and a connecting element between the said arm and the sound emitter.

5. A deflation indicator for tires, comprising a holding device in the form of an arched strap having hooks at its ends, adapted to be engaged by the rim and the tire of a wheel, a sound emitter having a reed secured at one end to the holding device, an actuating arm in the form of a spring strip having one end attached to the strap of the holding device and having its free end adapted to be deflected by a spreading pneumatic tire, and a pin secured to the said arm and adapted to engage the reed to cause actuation of the reed when the free end of the arm moves in opposite directions.

6. A deflation indicator for tires having a holding device in the form of an arched strap with hooks at its ends, the hooks being adapted to be engaged by the marginal edges of a wheel rim and the bead portions of a pneumatic tire, a sound emitting reed having one end attached to the said strap, the reed being resilient and having a natural tension to flex the free end outwardly, an actuating arm in the form of a spring strip having one end attached to the strap and the free end adapted to be pressed outwardly by a spreading tire, the arm having a natural tension to move the free end inwardly, and a pin secured to the arm and engaging the reed, normally holding the reed pressed inwardly when the tire has its normal contour.

7. A deflation indicator for tires as claimed in claim 6, the reed having a sound emitting section adapted to flex in a reverse direction on the flexure of the reed from its innermost to its outermost position, whereby the spreading section of the tire in contact with the ground is adapted to force the free end of the actuating arm outwardly and permit the reed to flex to give a first sound, the said arm under its natural tension moving inwardly when a portion of the tire regains its normal contour, the said pin then flexing the reed in the opposite direction inwardly causing the reed to produce a second sound.

8. A deflation indicator for tires having a holding device with means for attaching said device to the rim of a wheel, said holding device having a sound emitting reed in the form of a spring plate having one end attached to the holding device, a cover over the reed also attached to the holding device, said reed having a sound producing section operative on opposite directions of flexing the reed from an inward to an outward position or vice versa, an actuating arm in the form of a spring strip attached at one end to the holding device and having its free end adapted to engage the side wall of a tire and to be pressed outwardly on spreading of the tire, and a pin secured to the arm engaging the reed.

9. A deflation indicator for tires having a holding device adapted to be secured to a wheel to rotate therewith, a sound emitting device in the form of a reed with one end attached to the holding device and having a natural resiliency to flex outwardly, the reed having the characteristics of emitting a sound when flexed from an inner to an outer position and vice versa, and an actuating arm adapted to be secured to the wheel and having a free end adapted to engage the side wall of a tire and to be flexed outwardly on the spreading of the deflated section of the tire under the pressure of the ground contact of the tire, the arm having a natural tension to bend inwardly towards the tire, and an operating element interconnecting the reed and the arm to restrain the reed from outward movement and hold it in its inward position in the normal operation of the wheel but to permit outward flexing of the reed when a section of the tire is distorted thereby emitting a first sound and to force the reed inwardly from its outer position when the tire regains its normal contour and thereby causing the reed to emit a second sound.

ANDREW J. BARNHART.
RALPH F. ESSERT.